UNITED STATES PATENT OFFICE.

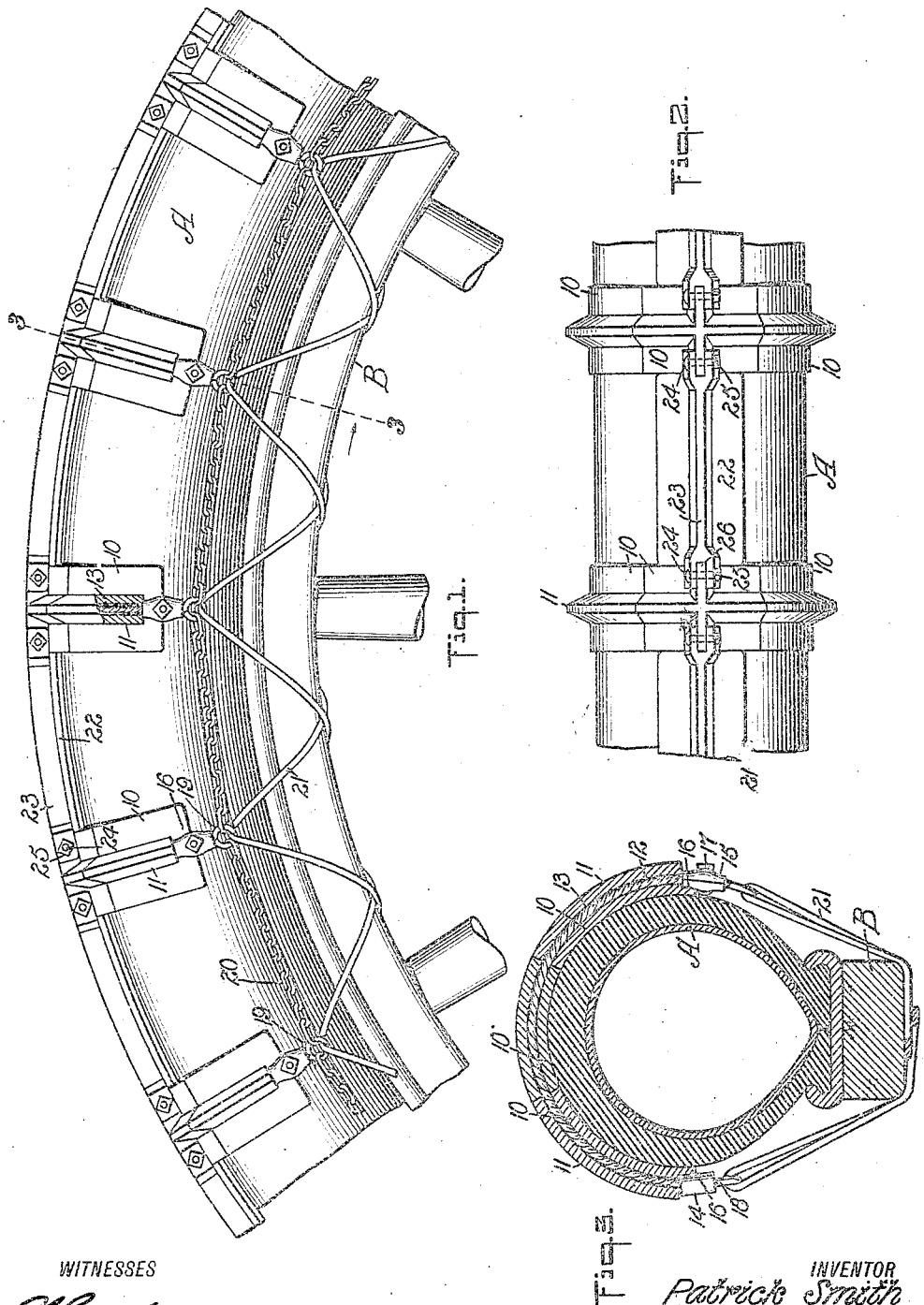

PATRICK SMITH, OF FORESTHILL, CALIFORNIA.

GRIP FOR AUTOMOBILE-TIRES.

1,239,312.  Specification of Letters Patent.  Patented Sept. 4, 1917.

Application filed October 20, 1916. Serial No. 126,709.

*To all whom it may concern:*

Be it known that I, PATRICK SMITH, a citizen of the United States, and a resident of Foresthill, in the county of Placer and State of California, have invented a new and Improved Grip for Automobile-Tires, of which the following is a full, clear, and exact description.

The prime object of my invention is to provide an attachment that may be applied to the shoes of automobile tires to present effective gripping members and of a character to accommodate itself to the flexure of the tire.

More specific objects of the invention are to provide an attachment of the indicated character composed of sections made up of parts that may be readily assembled; and to provide an attachment to be durable and not liable to become broken or disarranged.

The invention will be particularly explained in the specific description following.

Reference is to be had to the accompanying drawings forming a part of this specification in which similar reference characters indicate corresponding parts in all the views.

Figure 1 is a partly sectional side elevation of a portion of a wheel and tire showing my attachment applied thereto;

Fig. 2 is a plan view of a section of a tire having my invention applied thereto;

Fig. 3 is a cross section on the line 3—3, Fig. 1.

In constructing an attachment in accordance with my invention, a series of transverse gripping sections are provided each composed of separate curved members 10, the curvature corresponding to the curve of the tire shoe A to which the attachment is to be applied. Each member 10 of a gripping section is formed with a beveled rib 11, said ribs alining when the members are assembled.

The members 10 of each section are flexibly connected through the medium of a transverse cable 12 which preferably is of wire, said cable being accommodated in registering bores 13 in the respective members 10, the bores of a given section being in register. Preferably, the bore 13 is formed in each section at the base of the rib 11.

On each cable 12 at one end is permanently secured a sleeve or head 14 of greater diameter than the bore 13 and adapted to abut against the end of the adjacent rib 11. At the opposite side of the tire a clamp 15 is secured to the end of the cable 12 to abut against the end of the adjacent rib 11. The ribs 11 on the side sections 10 terminate short of the inner ends of said sections whereby to produce projecting flanges 16 which are overlapped by the elements 14, 15. The clamp 15 is composed of two sides adapted at their outer ends to receive between them, the adjacent end of the cable 12 to which the clamp sections are secured by a bolt 17. On the sleeve or head 14 at the inner end, a ring 18 is rigidly secured and a ring 19 has a member thereon extending between the sections of the clamp 15 at the inner end so that the bolt 17 will effectively clamp both the cable and the said ring 19.

The respective rings 19 are connected by chain sections 20 that extend annularly about the tire. Also, a cord or equivalent flexible element 21 is laced alternately through the rings 18, 19 and beneath the felly B.

Adjacent transverse gripping sections are connected and spaced by peripherally arranged links 22 having longitudinal gripping ribs 23 thereon, which preferably are beveled like the ribs 11. The ends of the links 22 are forked and receive bolts 24, or the like, bolts being shown in the illustrated example and provided with nuts 25, the bolts passing also through flanges 26 on the opposite sides of the central members 10. The provision of the clamps 15 permits of the ready detachment of the adjacent end of the cable 12 so that the latter may be drawn through the members 10 for repair or the like.

By the described construction effective gripping members are provided on the tire and the elements, it will be observed are of strong and simple construction that may be readily assembled.

Having thus described my invention, I claim as new, and desire to secure by Letters Patent:

A grip attachment for tires comprising spaced transverse curved sections, each section being composed of separate side members and an intermediate member, said members having registering bores and following the curvature of the members, a flexible cable extending through the bores of the respective members in each section, a sleeve rigidly secured to one end of the cable and abutting against the end of the adjacent transverse section, a clamp formed of separable members detachably secured to the opposite end of the cable, and abutting the adjacent end of the section, means to secure the respective curved sections on a tire in spaced relation.

PATRICK SMITH.